(12) United States Patent
Isozaki

(10) Patent No.: US 7,297,362 B2
(45) Date of Patent: Nov. 20, 2007

(54) MAGNETIC RECORDING MEDIUM AND THE METHOD OF MANUFACTURING THE SAME

(75) Inventor: Makoto Isozaki, Nagano (JP)

(73) Assignee: Fuji Electric Device Technology Co., Ltd. (JP)

( * ) Notice: Subject to any disclaimer, the term of this patent is extended or adjusted under 35 U.S.C. 154(b) by 480 days.

(21) Appl. No.: 10/830,968

(22) Filed: Apr. 23, 2004

(65) Prior Publication Data

US 2005/0003106 A1  Jan. 6, 2005

(30) Foreign Application Priority Data

Apr. 23, 2003  (JP)  ............... 2003-118435

(51) Int. Cl.
*B05D 5/12* (2006.01)
(52) U.S. Cl. .............. 427/127; 427/130; 428/835
(58) Field of Classification Search ............... 427/127, 427/130; 428/835
See application file for complete search history.

(56) References Cited

U.S. PATENT DOCUMENTS

| | | | | |
|---|---|---|---|---|
| 4,823,578 | A | * | 4/1989 | Coe et al. ............ 72/47 |
| 2002/0043332 | A1 | | 4/2002 | Itai et al. |

FOREIGN PATENT DOCUMENTS

| | | | |
|---|---|---|---|
| JP | 57-94930 | A | 6/1982 |
| JP | 02-044519 | A | 2/1990 |
| JP | 5-151568 | A | 6/1993 |
| JP | 7-58545 | A | 3/1995 |
| JP | 8-321039 | A | 12/1996 |
| JP | 40-166328 | * | 6/1998 |
| JP | 2003-6849 | A | 1/2003 |
| JP | 2004-326880 | | 11/2004 |

OTHER PUBLICATIONS

English equivalent abstract for JP 40-166328, EAST.*
Related co-pending U.S. Appl. No. 11/466,285; Kazuhiro Kusakawa et al.; "Magnetic Recording Medium and Method of Manufacturing The Same"; filed Aug. 22, 2006; Spec. pp. 1-15; Figs. 1-12.
Relevant portion of Austrian Search Report of corresponding patent application No. 200401907-1 with filing date of Apr. 6, 2004.

* cited by examiner

*Primary Examiner*—Alain L. Bashore
(74) *Attorney, Agent, or Firm*—Rossi, Kimms & McDowell LLP

(57) ABSTRACT

A magnetic recording medium and a manufacturing method for making it are disclosed. The method facilitates preventing the lubricant deposited on the end face of the magnetic recording medium from migrating onto the major surfaces thereof. The lubricant deposited on an end face of a magnetic disk, which may migrate onto the major surfaces of the magnetic disk, is wiped off by the rotating magnetic disk with the lubricant deposited thereon, by spraying a solvent onto a wiping tape while feeding the wiping tape, and by pressing the wet wiping tape containing the solvent to the end face of the magnetic disk with a pad while the feeding of the wiping tape is discontinued. Alternatively, the lubricant deposited on the end face of a magnetic disk is solidified to deprive the lubricant of its fluidity by rotating the magnetic disk with the lubricant deposited thereon while irradiating it with ultraviolet radiation from a UV lamp through a slit opened in a shield on the lamp to the end face of the magnetic disk.

4 Claims, 4 Drawing Sheets

- 25 : LIQUID LUBRICANT LAYER
- 24 : PROTECTION LAYER
- 23 : MAGNETIC LAYER
- 22 : NONMAGNETIC METAL UNDERCOATING LAYER
- 21 : ALUMINUM SUBSTRATE (Nonmagnetic Substrate)

DEGREES OF ANGLE

MAGNETIC RECORDING MEDIUM AND THE METHOD OF MANUFACTURING THE SAME

BACKGROUND OF THE INVENTION

A. Field of the Invention

The present invention relates to magnetic recording media mounted on data storages for computers and such information processing apparatuses or on data storages, especially hard disk drives, for household appliances. The present invention relates also to the method of manufacturing the magnetic recording media.

B. Description of the Related Art

Recently, the storage capacities of data storage devices and the recording capacities of magnetic recording media (hereinafter referred to simply as the "magnetic disks") used for the information processing apparatuses including computers have increased steadily in association with the increase of the data processed by the information processing apparatuses and the downsizing of the information processing apparatuses. In association with the storage capacity increase, the rotating speed of the magnetic disk has been increased more and more to improve the data transfer speed. Currently, some hard disk drives rotate the magnetic disks at 15,000 rpm.

The natural vibration of the magnetic disk caused by its rotation is hazardous for high-speed rotation of the magnetic disk. The vibration of the magnetic disk caused by its rotation prevents the flying ability of the magnetic head, greatly impairing the reliability of the hard disk drive. To obviate this problem, glass disks exhibiting high rigidity have been used recently for facilitating high-speed rotation. However, the glass disks are expensive at present, and the use of these expensive glass disks increases the total costs of the hard disk drives. Therefore, relatively inexpensive aluminum disks have been used to realize stable high-speed rotation.

The aluminum disks have been thickened from 0.8 mm to 1.0 mm, and even to 1.27 mm, to improve their rigidity and to confine their natural vibration within an acceptable range. Recently, an aluminum disk of 1.6 mm in thickness has been proposed.

Usually, the magnetic disk includes an aluminum substrate, a nonmagnetic metal undercoating layer on the aluminum substrate, a magnetic layer on the undercoating layer, and a protection layer on the magnetic layer. The undercoating layer, the magnetic layer, and the protection layer are formed by sputtering, chemical vapor deposition (CVD) and other such conventional methods for film deposition. A lubricant is coated on the laminate formed so far. The lubricant is coated in many cases by dip-coating due to the excellent mass-productivity of this technique and the simplicity of the equipment for the dip-coating. The dip-coating is conducted by first diluting a stock solution of a liquid lubricant to an appropriate concentration considering the desired film thickness with a solvent (such as an organic fluorocarbon solvent). The disk with the laminate formed thereon is dipped for a certain period of time in the liquid lubricant solution prepared as described above. Then, the disk is pulled out of the liquid lubricant solution at a constant speed to evaporate the solvent and to absorb the lubricant component remaining on the disk onto the protection layer. In this way, a thin lubricant layer is formed on the protection layer. Alternatively, spin-coating and spray-coating can be employed to form the lubricant layer.

Although the dip-coating method has been employed to form the lubricant layer, it has been found that a lot of lubricant localizes to, and remains on, the end face portion of the magnetic disk opposite to the direction to which the magnetic disk is pulled up, and the remaining lubricant migrates with elapse of time to the peripheral portions in the major surfaces of the magnetic disk. Referring now to FIG. 6, the arrow A indicates the direction, to which the magnetic disk has been pulled up, and the darkened regions are the regions, to which the lubricant has migrated.

As the magnetic disk is thicker, the absolute amount of the lubricant migrating to the peripheral portions of the major surfaces becomes larger, since a larger amount of the lubricant localizes to the end face of the magnetic disk in proportion to its area. The lubricant is liable to migrate to the slider of the magnetic head flying over the peripheral portions of the magnetic disk to which the lubricant has migrated. As a result, the flying of the magnetic head becomes unstable, and the unstable flying of the magnetic head adversely affects the magnetic parametric performances and the durability against head seek (the durability against swinging). Although the current typical flying height of the magnetic heads is around 10 nm, the flying height of the magnetic heads is expected to be lower in perpendicular magnetic recording systems in the future. The lubricant migration will pose serious problems on these magnetic heads flying at a lower height.

To date, the problem of lubricant migration has been intangible. The lubricant amount on the end face of the magnetic disk was not included in the control items, since the magnetic disks were as thin as 0.8 mm or less and the flying height of the magnetic heads was from 15 to 20 nm, which is relatively higher than the present flying height of the magnetic heads.

Even when the lubricant concentration is optimized, the solvent for diluting the lubricant is selected, and the pulling-up speed is optimized to prevent the lubricant migration from occurring, it is impossible at present to prevent lubricant migration completely.

Japanese Unexamined Laid Open Patent Application 2003-6849 and Japanese Examined Patent Application H07 (1995)-58545 disclose techniques in which a wiper or a buff is pressed onto the disk surface on which the lubricant is coated, in order to uniformly distribute the lubricant and to flatten the disk surface. However, the wiping treatment and the buffing treatment are applied only to the major surface of the magnetic disk, i.e., to the head flying region and the recording region, solely to improve the frictional performances such as the constant start stop (CSS) performance and to prevent the magnetic head from sticking to the magnetic disk. The wiping treatment and the buffing treatment have failed to obviate the problems of lubricant migration, in which the lubricant deposited on the end face of the magnetic disk migrates onto the major surfaces of the magnetic disk with the passage of time.

The present invention is directed at overcoming or at least reducing the effects of one or more of the problems set forth above.

SUMMARY OF THE INVENTION

It is one object of the invention to eliminate the problems caused by lubricant migration.

It is a further object of the invention to provide a manufacturing method which wipes off the lubricant deposited on the end face of the magnetic disk with a wiper containing a solvent to prevent the lubricant deposited on the end face of the magnetic disk from migrating onto the major surfaces of the magnetic disk or which solidifies the lubricant deposited on the end face of the magnetic disk by ultraviolet ray irradiation to deprive the lubricant of the fluidity.

It is yet another object of the invention to manufacture magnetic recording media using such methods.

These and other objects of the invention are provided by a first method of manufacturing a magnetic recording medium including a magnetic layer, a protection layer on the magnetic layer, and a liquid lubricant layer on the protection layer, the method including the steps of: coating the liquid lubricant layer on the protection layer, and pressing at a constant pressure a wiping tape containing a solvent to the end face of the magnetic recording medium that is rotating to wipe off the portion of the liquid lubricant layer coated on the end face of the magnetic recording medium.

According to a second aspect of the invention, there is provided a method of manufacturing a magnetic recording medium including a magnetic layer, a protection layer on the magnetic layer, and a liquid lubricant layer on the protection layer, the method including the steps of coating the liquid lubricant layer on the protection layer, and irradiating an ultraviolet ray to the end face of the magnetic recording medium that is rotating to solidify the lubricant component in the liquid lubricant layer coated on the end face of the magnetic recording medium.

Advantageously, the end face includes a side face portion including chamfer sections of the magnetic recording medium shaped with a circular disk having a certain thickness but excluding at least the magnetic head flying region of the magnetic recording medium.

Advantageously, a magnetic recording medium may be manufactured by any of the methods described above.

The wet-wiping removes the lubricant and the ultraviolet ray irradiation solidifies the lubricant. These treatments are applied only to the end face of the magnetic disk according to the invention, since these treatments impair the lubricity of the faces, to which any of these treatments is applied. In unfavorable environments in the hard disk drive containing generated gases or dusts, the magnetic head flying at the flying height of around 10 nm employed currently may come into contact intermittently with the head flying region of the magnetic disk. In a worst case, this causes the head to crash. In order to prevent head contact or head crash from occurring, it is necessary to leave the lubricant component on the head flying region without being removed or without being solidified.

BRIEF DESCRIPTION OF THE DRAWINGS

The foregoing advantages and features of the invention will become apparent upon reference to the following detailed description and the accompanying drawings, of which.

DETAILED DESCRIPTION OF PREFERRED EMBODIMENTS

Now the invention will be described in detail hereinafter with reference to the accompanied drawing figures which illustrate the preferred embodiment of the invention.

Figure 1:
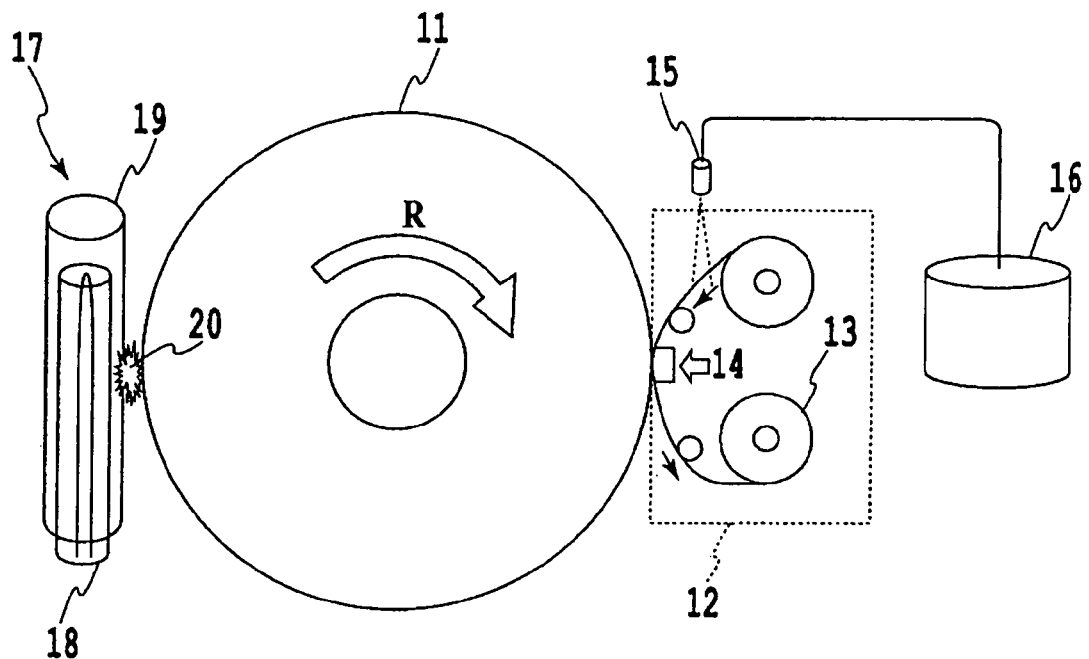
FIG. 1 is a block diagram schematically showing the manufacturing setups for applying a wet-wiping treatment and for applying an ultraviolet ray irradiation treatment to the end face of a magnetic disk.

FIG. 1 is a block diagram schematically showing the manufacturing setups for applying a wet-wiping treatment and for applying an ultraviolet ray irradiation treatment to the end face of a magnetic disk.

In FIG. 1, the rotation direction of magnetic disk 11, onto which a lubricant has been coated, is indicated by the arrow R. In FIG. 1, end-face wet-wiping unit 12 includes wiping tape 13 and pad 14. Solvent spray nozzle 15, and solvent storage tank 16 for feeding a solvent to spray nozzle 15 are shown. An ultraviolet ray irradiation unit (hereinafter referred to as "UV irradiation unit") 17 includes UV lamp 18 and shield 19. Slit 20, a long and fine hole, also is shown in FIG. 1. Although wet-wiping unit 12 and ultraviolet ray irradiation unit 17 are shown in FIG. 1, any of wet-wiping unit 12 and UV irradiation unit 17 may be installed solely with no problem.

The treatment using wet-wiping unit 12 is conducted in the following way. Magnetic disk 11 with a lubricant layer formed thereon is rotated in direction R. A solvent is ejected onto wiping tape 13 on the feeding side thereof from spray nozzle 15. Wiping tape 13 is fed at the start of every treatment and the feed thereof is stopped during the treatment. The wet section of wiping tape 13 containing the solvent sprayed thereto is pressed to the end face of magnetic disk 11 with pressing pad 14 at a predetermined pressure to wipe off the lubricant layer coated on the end face of magnetic disk 11 with wiping tape 13. The arrows illustrated near wiping tape 13 in FIG. 1 indicate the direction, to which wiping tape 13 is fed or wound up.

The treatment using UV irradiation unit 17 is conducted in the following way. Magnetic disk 11 with a lubricant layer formed thereon is rotated in direction R. The lubricant component in the lubricant layer coated on the end face of magnetic disk 11 is solidified by irradiating an ultraviolet ray from UV lamp 18 to the end face of magnetic disk 11 through slit 20 opened in shield 19. For example, slit 20 may be about 2 mm in width and about 5 mm in length.

Figure 2:
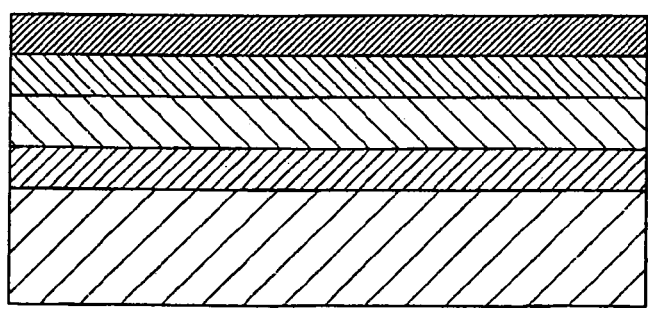
FIG. 2 is a cross sectional view of a magnetic recording medium (magnetic disk) treated with the setups of FIG. 1.

FIG. 2 is a cross sectional view of a magnetic recording medium (magnetic disk) treated with the setups of FIG. 1.

Referring now to FIG. 2, the magnetic disk includes aluminum substrate 21 (1.27 mm in thickness), nonmagnetic metal undercoating layer 22 on substrate 21, magnetic layer 23 on undercoating layer 22, protection layer 24 on magnetic layer 23, and liquid lubricant layer 25 on protection layer 24. Undercoating layer 22, magnetic layer 23, and protection layer 24 are formed one by one by the sputtering method or by the CVD method. Liquid lubricant layer 25 is formed, for example, by the conventional dipping method described earlier in connection with the prior art. A plastic substrate and such a nonmagnetic substrate may be used in substitution for aluminum substrate 21 with no problem.

Figure 3:
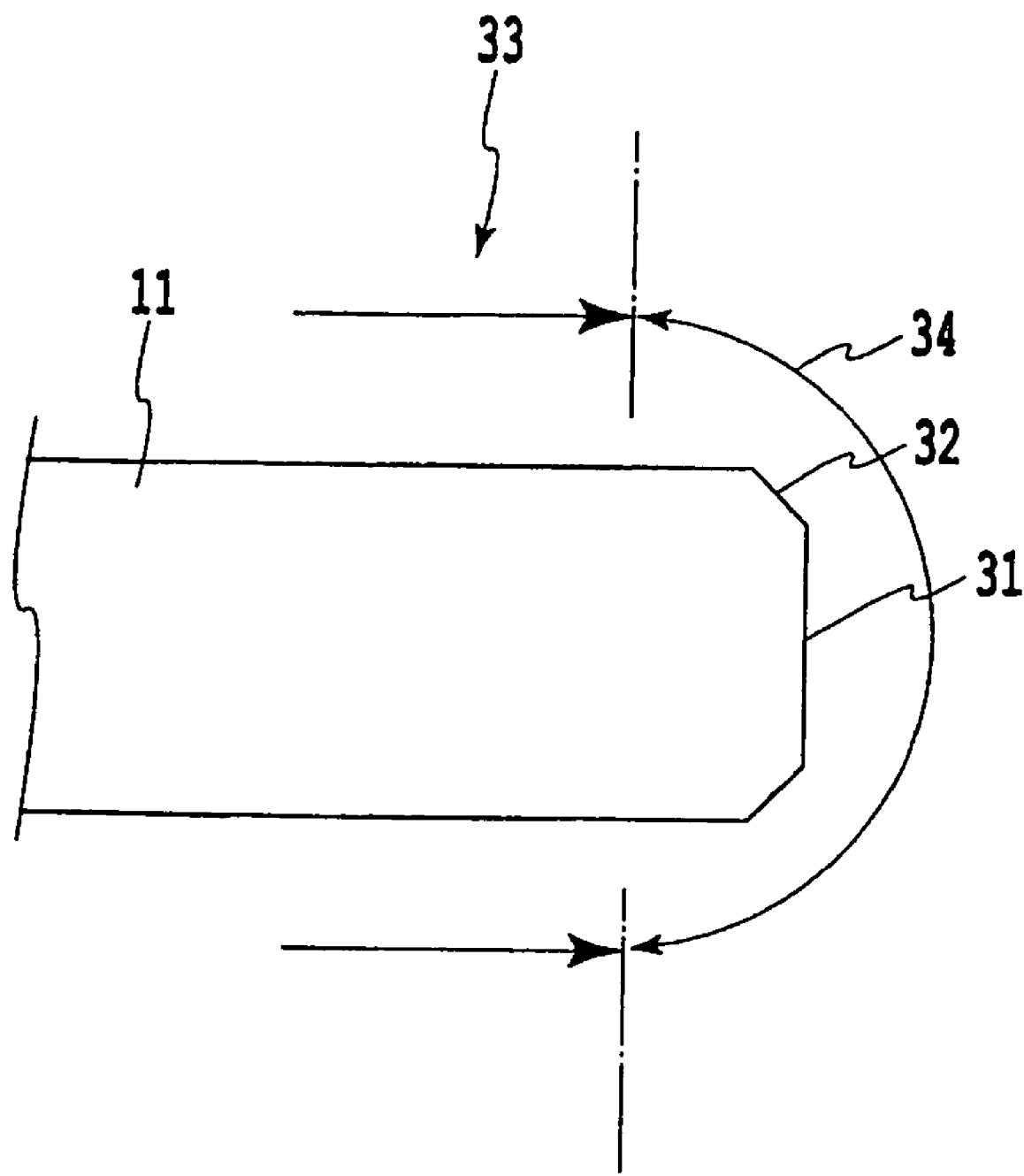
FIG. 3 is a cross sectional view schematically showing the maximum region of the end face of a magnetic disk, to which the treatments according to the invention are applied.

FIG. 3 is a cross sectional view schematically showing the maximum region of the end face of a magnetic disk, to which the treatments according to the invention are applied.

In FIG. 3, the maximum region of end face 34, to which the treatments according to the invention are applied, and magnetic head flying regions 33 are shown. End face 34 includes side face section 31 and chamfer sections 32. In the descriptions of the invention, the term "end face" designates the entire side face portion, including chamfer sections 32, of a circular magnetic recording medium (magnetic disk) 11 having a certain thickness. Magnetic head flying regions 33 are excluded from the "end face."

Experiments

Four kinds of magnetic disks (A) through (D) having the structure shown in FIG. 2 are fabricated:

Magnetic disk (A): any of the above described treatments is not applied thereto after the lubricant coating.

Magnetic disk (B): the end face thereof is wiped with a dry wiper in wiping unit 12, from which spray nozzle 15 is removed.

Magnetic disk (C): the end face thereof is wiped with a wet wiper, containing a solvent, of wet-wiping unit 12.

Magnetic disk (D): the end face thereof is irradiated with an ultraviolet ray using UV irradiation unit 17.

The fabricated magnetic disks are left in an environment, kept at the normal temperature and the normal humidity, for a week. Then, the major surfaces of the magnetic disks are observed under an optical surface analyzer (hereinafter referred to as an "OSA").

In fabricating the magnetic disks (B) and (C), a wiper (called also a "wiper tape" or a "wiping tape," TORAY-SEE™ 53203TR supplied from Toray Industries, Inc.) is used. In fabricating the magnetic disk (C), a solvent (Vertrel® XF supplied from Du Pont Co.) is used for wet-wiping. Although any solvent may be used as long as it dissolves the lubricant used, it is preferable to use the solvent used for coating the lubricant in manufacturing the magnetic disk. Preferably, the wiper is resistive against the solvent used in wiping off the lubricant.

The apparatus for end face wiping as shown in FIG. 1 is set up by the present inventor for use in the Fuji Electric Co., Ltd. The solvent is ejected onto wiping tape 13 on the feeding side thereof from spray nozzle 15. Wiping tape 13 is fed at the start of every wiping treatment and the feed of wiping tape 13 is stopped during the wiping treatment. Wet tape 13 is pressed to the end face of magnetic disk 11 by pad 14, the hardness thereof is 60 degrees (60°). If the hardness of pad 14 is too low, the circumference of disk 11 is pressed into pad 14 and the magnetic head flying regions 33 (cf. FIG. 3) on major surfaces of disk 11 may be wiped. Therefore, it is not desirable for pad 14 to be too soft. During the wiping treatment, disk 11 is rotated at 200 rpm. The pressure, under which tape 13 is pressed to the end face of disk 11, is 0.5 kg/cm$^2$. Each wiping treatment is conducted for 10 seconds.

UV lamp 18 used in fabricating magnetic disk (D) emits ultraviolet radiation having wavelengths of 185 nm and 254 nm. UV lamp 18 is spaced apart for the shortest distance of 10 mm from the end face of magnetic disk 11. The ultraviolet radiation is irradiated at the strength of from about 10 mW/cm$^2$ to about 15 mW/cm$^2$ for 10 seconds in each irradiation treatment. UV lamp 18 is covered with shield 19, slit 20, 2 mm in width and 5 mm in length, is opened in a part of shield 19, and slit 20 is positioned in closest proximity to the end face of magnetic disk 111 so that the ultraviolet radiation may be irradiated only to the end face of magnetic disk 11.

Experimental Results

The magnetic disks (A) through (D) fabricated are left in an environment, kept at the normal temperature and the normal humidity, for a week. Then, the major surfaces of the magnetic disks (A) through (D) are observed under an OSA (OSA 5100 supplied from Candela Instrumens). The OSA is an instrument that quantitatively determines the state of a material (such as carbon, a lubricant, and a contaminant) on a reflective layer (such as a magnetic layer and a carbon layer) by irradiating a laser beam consisting of a P polarized wave (longitudinal wave) or an S polarized wave (transversal wave) obliquely onto the surface of the layer to be analyzed and by detecting the phase difference of the reflective beam. In the present experiment, the phase difference change of a Q polarized wave consisting of a P polarized wave and an S polarized wave is employed, since the use of the Q polarized wave facilitates more sensitive analysis than the use of the P polarized wave or the S polarized wave. The phase difference change of the Q polarized wave is the difference of the phase difference between the P polarized wave and the S polarized wave in the incident beam and the phase difference between the P polarized wave and the S polarized wave in the reflective beam.

FIGS. 4(A) through 4(D) are schematic OSA images showing the states of the surfaces of magnetic disks obtained by the OSA described above. FIGS. 4(A) through 4(D) show the respective surface states of the corresponding magnetic disks (A) through (D). The original pictures of FIGS. 4(A) through 4(D) are color photographs. If the color photographs are converted to black and white pictures with half tones, the images will not exhibit clear contrasts. To avoid this problem, the contrasts are intensified so that the portions illustrated by black are clearly perceivable.

Figure 4A:
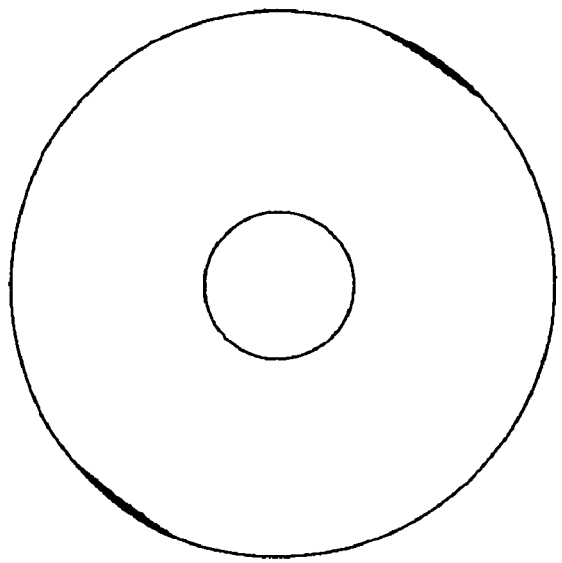
FIGS. 4(A) through 4(D) are schematic OSA images showing the states on the surfaces of magnetic disks obtained by the OSA.
Figure 4B:
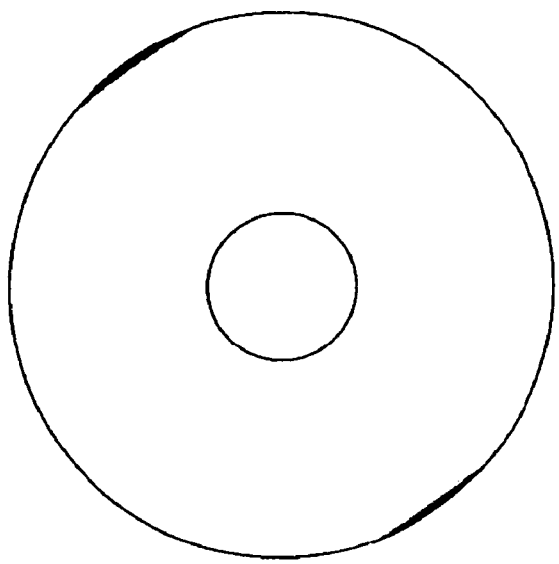
Figure 4C:
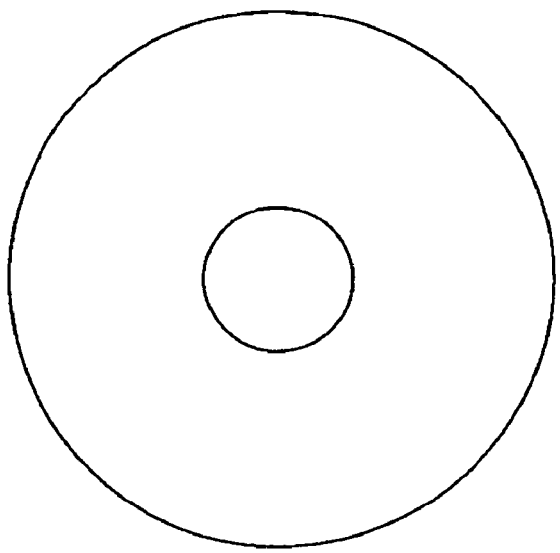
Figure 4D:
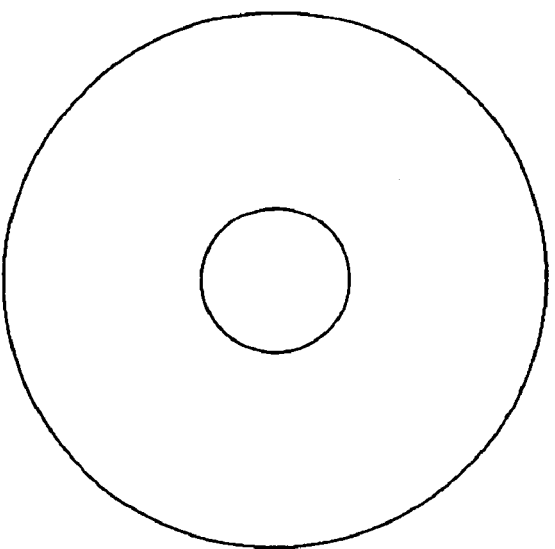

As FIGS. 4(C) and 4(D) show that lubricant migration onto the major disk surfaces is prevented from occurring in the magnetic disk (C) treated by wet-wiping and the magnetic disk (D) treated by UV irradiation. As FIG. 4(B) indicates, the dry-wiping treatment is not effective.

The effects of the treatments are judged by the OSA determination. In the image processing, the contrast range of the lubricant layer thickness is adjusted at around 5 Å. If portions illustrated as black are not found, it is determined that the treatment is effective. The portion illustrated by black is a portion in which the lubricant layer is thicker (that is a portion into which the lubricant has migrated from the end face of the magnetic disk).

Figure 5:
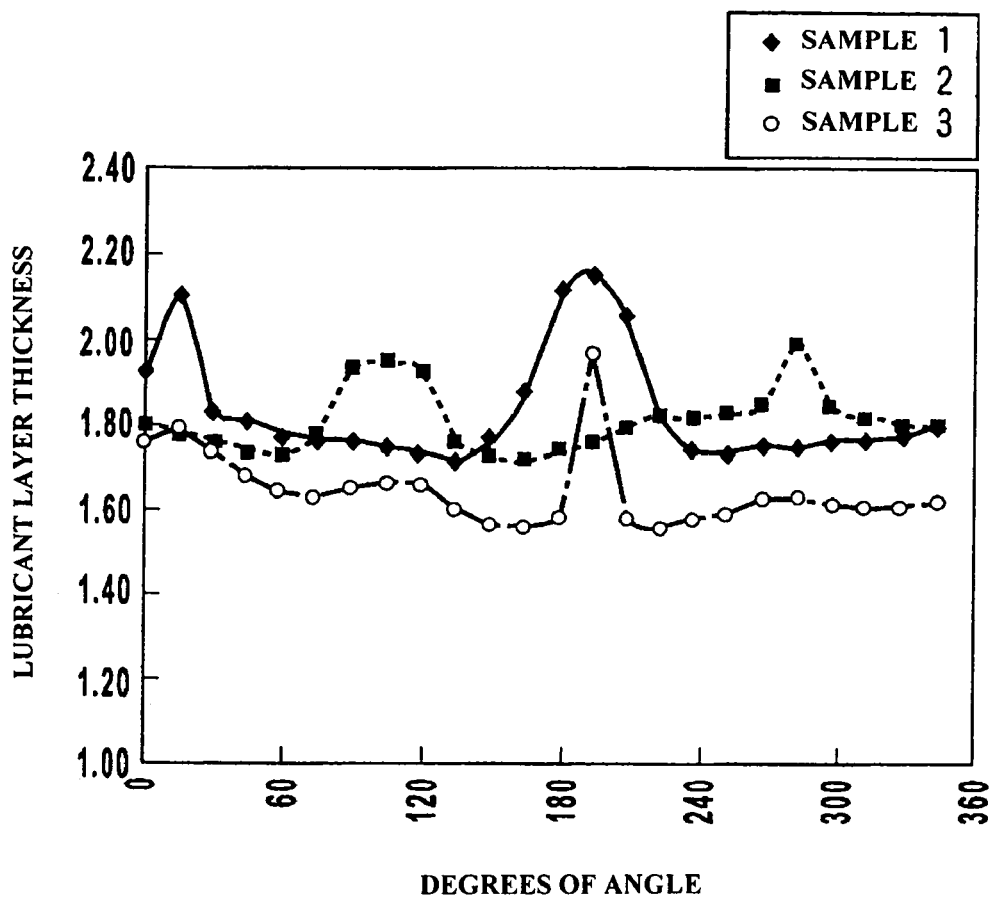
FIG. 5 shows the results of film thickness measurement conducted using a Fourier transform infrared spectrophotometer (FTIR). It shows that the portions in the major surfaces of the magnetic disks to which the lubricant has migrated are thicker by about 5 Å than the other portions.
Figure 6:
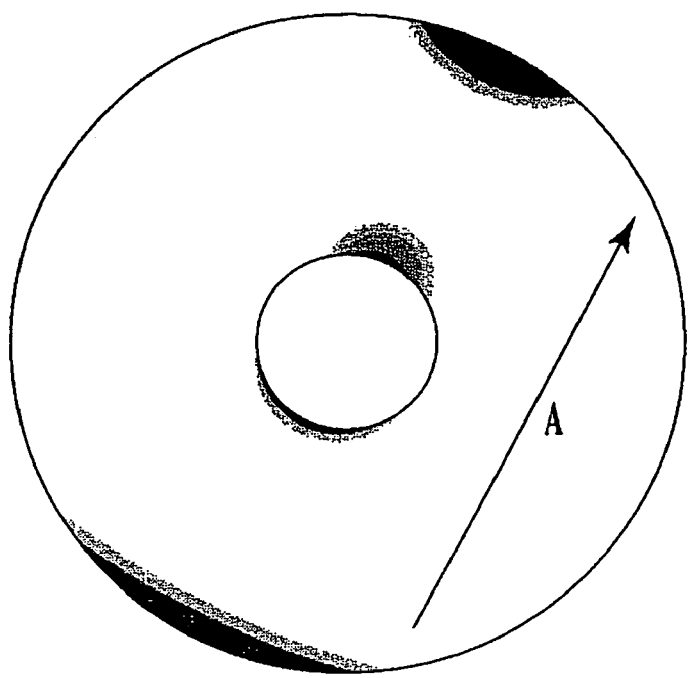
FIG. 6 is a top plan view of a magnetic disk including the major surface portions thereof, onto which the lubricant has migrated.

The lubricant layer thickness in the black portions is measured with a Fourier transform infrared spectrophotometer (FTIR). Results are shown in FIG. 5. In FIG. 5, the horizontal axis represents the position in the disk major surface measured from the reference position and expressed by degrees of angle and the vertical axis represents the lubricant layer thickness. The portions, such as the portions around the 15 degrees of angle and 180 degrees of angle on the sample 1, at which the lubricant layer is thicker than in the surrounding portions are the portions illustrated as black on the OSA image. Thus, it has been confirmed also by FTIR layer thickness measurement that the portions illustrated by black (darkly) on the OSA image are thicker by around 5 Å than the other portions. Since the measurement with the FTIR takes a long time, the lubricant migration is detected usually from the OSA images.

Although the invention has been described in connection with the preferred embodiments and the experiments thereof, changes and modifications such as change of the relevant numerical values, employment of similar methods and materials, and combinations with the conventional techniques are obvious to those skilled in the art without departing from the true spirits of the invention. For example, combination of the wet-wiping treatment and the UV irradiation treatment may be an additional embodiment according to the invention. Therefore, the invention be understood not by the specific descriptions herein but by the appended claims.

As described above, the lubricant deposited on the end face of the magnetic disk is wiped off with a wet wiping tape or solidified by irradiating an ultraviolet ray to the end face of the magnetic disk. Therefore, the lubricant deposited on the end face of the magnetic disk is prevented from migrating onto the major surfaces of the magnetic disk and the reliability thereof is improved.

What is claimed is:

1. A method of manufacturing a magnetic recording medium including a magnetic layer, a protection layer on the magnetic layer, and a liquid lubricant layer on the protection layer, the method comprising:

coating a liquid lubricant layer on the protection layer of a magnetic recording medium, and pressing, at a constant pressure, a wiping tape containing a solvent to the end face of the magnetic recording medium as it is rotated, whereby to wipe off the portion of the liquid lubricant layer coated on the end face of the magnetic recording medium.

2. A method of manufacturing a magnetic recording medium including a magnetic layer, a protection layer on the magnetic layer, and a liquid lubricant layer on the protection layer, the method comprising:

coating a liquid lubricant layer on the protection layer of a magnetic recording medium, and irradiating an ultraviolet ray onto the end face of the magnetic recording medium as it is rotated, whereby to solidify the lubricant component in the liquid lubricant layer coated on the end face of the magnetic recording medium.

3. The method according to claim 1, wherein the end face comprises a side face portion including chamfer sections of the magnetic recording medium shaped with a circular disk having a certain thickness but excluding at least the magnetic head flying region of the magnetic recording medium.

4. The method according to claim 2, wherein the end face comprises a side face portion including chamfer sections of the magnetic recording medium shaped with a circular disk having a certain thickness but excluding at least the magnetic head flying region of the magnetic recording medium.

* * * * *